L. CHUTE.
ANIMAL TRAP.
APPLICATION FILED DEC. 8, 1919.
1,389,626.
Patented Sept. 6, 1921.
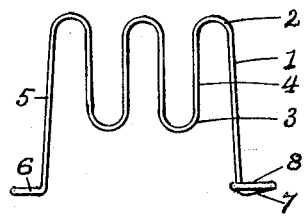
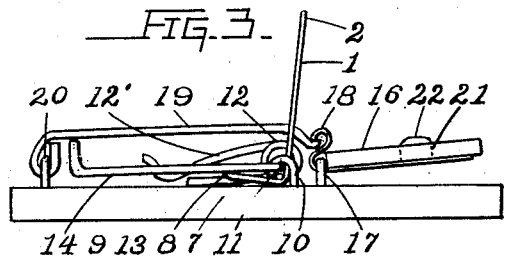
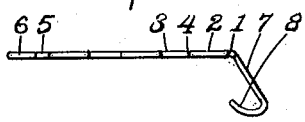
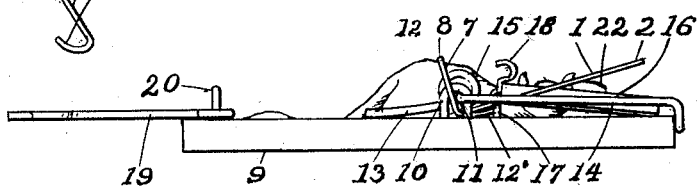
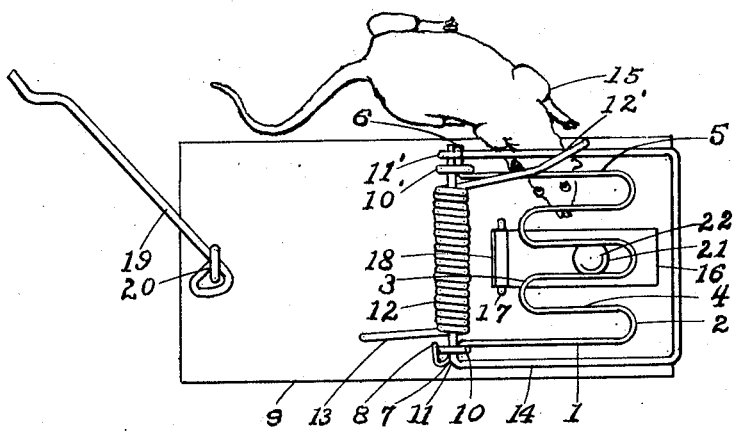
INVENTOR
Levi Chute.
BY George W. Hinton
ATTORNEY

UNITED STATES PATENT OFFICE.

LEVI CHUTE, OF ST. JOSEPH, MISSOURI.

ANIMAL-TRAP.

1,389,626.    Specification of Letters Patent.    Patented Sept. 6, 1921.

Application filed December 8, 1919. Serial No. 343,157.

*To all whom it may concern:*

Be it known that I, LEVI CHUTE, a citizen of the United States, residing at St. Joseph, in the county of Buchanan and State of Missouri, have invented certain new and useful Improvements in Animal-Traps, of which the following is a specification, reference being had therein to the accompanying drawing.

My invention relates to improvements in traps which are used for catching animals, and the objects of my improvements are, first; to provide a detachably attached shield for animal traps, which shall act as a practically non-obscuring shield for the bait at one side thereof, compelling a live animal to approach the bait, over such parts of the trap as shall insure the entrapping therein of the animal, when he springs the trap, second; to so construct the shield that it shall be moved by the trap from its set position, to a position over the bait, for shielding the latter from further encroachment by other animals, after the trap is sprung, third; to so construct and arrange said shield that it shall in no way interfere with setting the trap, while it is attached thereto, fourth; to provide a shield of this class, which shall be neat in appearance, occupy the minimum amount of space and be extremely cheap in cost of manufacture.

I attain these objects by the devices illustrated in the accompanying drawings, in which:

Figure 1 is a rear view of the attachment. Fig. 2 is a top plan of the attachment seen in Fig. 1. Fig. 3 is a side view of a conventional trap, in set position, showing the attachment attached thereto in its erected position. Fig. 4 is a view similar to Fig. 3, showing the trap in sprung position and the shield in position for shielding the bait from further encroachments. Fig. 5 is a top plan of the parts seen in Fig. 4.

Referring to Figs. 1 and 2, my invention comprises the one piece wire shield, which wire is bent to form the following parts. The upright 1, its return bend 2, which is connected with the reverse bend 3, by the grid wire 4, which latter in like manner is connected with the adjacent grid wire, and so on, forming a grid composed of a plurality of grid wires, the last one of which is in like manner connected with the upright 5. The hinge bolt 6 is formed with the lower end of the upright 5, at a right angle thereto.

The arm 7 is formed on the lower end of the upright 1, and is extended backward and outward therefrom. The crank 8 is formed on the outer end of said arm and extends inward therefrom.

The previously described parts form the shield, which is detachably attached to the type of trap shown in Figs. 3, 4 and 5.

This trap forms no original part of my invention, but a detailed description of the same is deemed necessary, in order to describe the attachment thereto and the operation thereby of the shield.

A staple 10 and a staple 10' are secured on the edges of the body 9 of the trap. The end portions of the shaft 11 are oscillatably mounted in said staples. The helical spring 12 is mounted on said shaft. The spring holding arm 13 is formed on one end of said spring, extends therefrom toward the rear of the trap body and is abutted on the upper face of the latter. The opposite end of said spring terminates in the arm 12', which extends therefrom across one side of the upper jaw 14 of the trap, the front portion of the body 9 forming the lower jaw thereof. Said arm is adapted to move the jaw 14 from the position seen in Fig. 3, to the position seen in Figs. 4 and 5, for catching the animal 15 between said jaws.

The tongue 16 of the trap is oscillatably mounted on the staple 17, which is secured on the body 9. The catch hook 18 is secured on the hinge mounted end of said tongue. The free end of the trigger 19 is detachably engaged with said hook, for holding said upper jaw in set position, as seen in Fig. 3. The other end of said trigger is oscillatably mounted on the staple 20, which is secured on the body 9.

Said upper jaw is formed by bending the rod which forms the shaft 11 at a right angle thereto, and it is then further bent to form a rectangular U shaped jaw, with the end of it secured at 11' on the end of the shaft 11.

The indicated recess 21 (see Fig. 3,) is formed in the tongue 16, in which recess the bait 22 is tightly pressed.

In attaching the previously described shield to the trap, the operator of the shield and trap, grasps the body 9 of the trap in one hand and with the thumb of said hand overcomes the spring 12 and holds the upper jaw 14 in the position seen in Fig. 3. With the index finger and the thumb of the other hand he grasps the uprights 1 and 5, of the shield seen in Fig. 1, passes the end of the crank 8 and also the arm 7 through the staple 10, from the inner side thereof, until the upright 1 is against said staple. He then presses the lower end of the upright 5 toward said upright 1 and thereafter places the end of the hinge bolt 6 at the inner side of the staple 10', after which he releases the upright 5, the elasticity of which moves the same outward, thereby carrying the hinge bolt 6 through the staple 10'; thereby hingedly connecting said shield with the body 9. Said operator then moves the trigger 19 from the position seen in Fig. 5, to the position seen in Fig. 3, for setting the trap, which he thereafter puts in a proper place for catching an animal 15.

It will be seen that the designated side of the upper jaw 14 presses upon the crank 8, thereby holding the described shield in a practically vertical position. Said animal (before being entrapped) can see the bait 22, by looking between the grid wires 4 of said shield. He can also see and understand that said bait can not be reached by approaching it over the rear portion of said trap. He therefore passes around the shield and reaches said bait over some part of the front portion of the trap, thus insuring the entrapping of the animal.

Said animal thereafter attempts to eat the bait 22, and in doing so he presses the free end portion of the tongue 16 downward, thereby moving the catch hook 18 from over the free end of the trigger 19. At this juncture the thus released jaw 14, actuated by the spring 12, is moved from the crank 8 and the arm 12' is moved against the upright 5, thereby oscillating the described shield and the upper jaw 14, from the position seen in Fig. 3 to the position seen in Figs. 4 and 5.

This movement of the parts entraps the animal 15, between the jaw 14 and the front portion of the body 9 of the trap, as seen in Figs. 4 and 5, and at the same time moves the described shield into such position that the bait 22 is thereby shielded from further encroachments.

While the parts are in this position, the arm 7 passes through the lowest portion of the space, which is bounded by the staple 10 and the body 9, of the trap, and acts as a hinge member for the upright 1. In like manner, as seen in Fig. 5, the hinge bolt 6 passes through the lowest portion of the space beneath staple 10'; thereby providing hinge members, which pass through said staples at such low points, that their respective uprights 1 and 5, incline upward therefrom, to their ends, which latter comprise the grid 4.

The described trap may be reset from time to time, as desired, without detaching the shield from the trap, which latter is done in the following manner.

The jaw 14 is manually held, as previously described, after which the end of the upright 5 is pressed inward, after which the hinge bolt 6 is removed from the staple 10', (see Fig. 5,) and the arm 7 and crank 8 are thereafter removed from the staple 10.

While I have shown and described the structural details of the shield, as seen in Figs. 1 and 2, in the foregoing manner, it is evident that said shield could be made in a variety of forms, well known to the wire grid maker's art, without departing from the spirit of my invention; which I reserve the right to do.

Having fully described my invention, what I claim as new, and desire to secure by Letters Patent, is:—

1. The combination with a spring actuated animal trap provided with bait holding means therefor and with a hinge member secured on each side of the central portion of the body of said trap; of a shield of grid formation said shield having other hinge members formed thereon and inserted in the hinge members of said trap respectively; a crank formed on the outer end of one of said hinge members of said shield said crank being adapted to be engaged by a movable portion of said trap for normally holding said shield in a practically vertical position while said trap is set; and an upright formed with said shield said upright being adapted to be engaged by another movable part of said trap after said spring is released thereby oscillating said shield from said vertical position to a position over said bait holding means.

2. The combination with the hinge members of a spring actuated animal trap said trap being provided with bait holding means therefor; of a bait shield formed of elastic material; other hinge members formed with said shield, which other hinge members are yieldably held in engagement with the hinge members of said trap respectively; shield holding means formed with one of said other hinge members whereby said shield is normally held in a practically vertical position across the central portion of said trap while the spring of said trap is set for action; and an upright formed with said shield said upright being engaged by a moving part of said trap after said spring is released, for oscillating said shield on its hinge members from said vertical position to a position over said bait holding means.

In testimony whereof I affix my signature.

LEVI CHUTE.